(12) United States Patent
Rajwar et al.

(10) Patent No.: US 9,146,610 B2
(45) Date of Patent: Sep. 29, 2015

(54) THROTTLING INTEGRATED LINK

(75) Inventors: Ravi Rajwar, Portland, OR (US);
Robert A. Mayer, Portland, OR (US);
Stephan J. Jourdan, Portland, OR (US);
Lily Pao Looi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 226 days.

(21) Appl. No.: 13/040,507

(22) Filed: Mar. 4, 2011

(65) Prior Publication Data

US 2012/0079159 A1    Mar. 29, 2012

Related U.S. Application Data

(60) Provisional application No. 61/386,505, filed on Sep. 25, 2010.

(51) Int. Cl.
*G06F 1/32* (2006.01)
*G06F 13/42* (2006.01)

(52) U.S. Cl.
CPC ............ *G06F 1/3253* (2013.01); *G06F 1/3206* (2013.01); *G06F 13/4295* (2013.01); *Y02B 60/1228* (2013.01); *Y02B 60/1235* (2013.01)

(58) Field of Classification Search
CPC . G06F 1/3253; G06F 1/3206; G06F 13/4295; Y02B 60/1228; Y02B 60/1235
USPC ............... 710/105–106, 305–306, 310–311, 710/313–315; 713/300, 320, 323–324; 702/130, 132
See application file for complete search history.

(56) References Cited

U.S. PATENT DOCUMENTS

| | | | |
|---|---|---|---|
| 5,404,544 A | 4/1995 | Crayford | |
| 5,761,516 A | 6/1998 | Rostoker et al. | |
| 5,893,153 A | 4/1999 | Tzeng et al. | |
| 6,009,488 A | 12/1999 | Kaviprapu | |
| 6,442,697 B1 | 8/2002 | Jain et al. | |
| 6,487,689 B1 * | 11/2002 | Chuah | 714/748 |
| 6,536,024 B1 | 3/2003 | Hathaway | |
| 6,721,840 B1 | 4/2004 | Allegrucci | |
| 6,980,024 B1 | 12/2005 | May et al. | |
| 7,181,188 B2 | 2/2007 | Vu et al. | |

(Continued)

FOREIGN PATENT DOCUMENTS

CN    102270187 A    12/2011
EP    2 656 173 A2    10/2013

(Continued)

OTHER PUBLICATIONS

'First-in first-out' in The Free On-Line Dictionary of Computing. Online Dec. 6, 1999. Retreived from Internet Oct. 1, 2013. <http://foldoc.org/fifo>.*

(Continued)

*Primary Examiner* — Thomas J Cleary
(74) *Attorney, Agent, or Firm* — Alpine Technology Law Group LLC

(57) ABSTRACT

Methods and apparatus for throttling an interface that is integrated on the same die as a processor are described. In one embodiment, a signal from an Integrated Input/Output hub (e.g., integrated on the same die as a processor) causes throttling of a link coupled between the IIO and an Input/Output (IO) device. Other embodiments are also disclosed.

19 Claims, 5 Drawing Sheets

(56) References Cited

U.S. PATENT DOCUMENTS

| | | | |
|---|---|---|---|
| 7,353,374 B1 | 4/2008 | Trimberger | |
| 7,702,639 B2 | 4/2010 | Stanley et al. | |
| 7,814,371 B2 | 10/2010 | Sams et al. | |
| 7,865,744 B2 | 1/2011 | Lee et al. | |
| 7,882,294 B2 | 2/2011 | Love | |
| 7,898,994 B2 | 3/2011 | Zhao et al. | |
| 8,181,059 B2 | 5/2012 | Millet et al. | |
| 8,304,698 B1* | 11/2012 | Tischler | 219/497 |
| 8,782,456 B2 | 7/2014 | Tan et al. | |
| 8,850,250 B2* | 9/2014 | Looi et al. | 713/323 |
| 2002/0033828 A1* | 3/2002 | Deering et al. | 345/502 |
| 2003/0159024 A1 | 8/2003 | Chen | |
| 2003/0226050 A1 | 12/2003 | Yik et al. | |
| 2004/0139283 A1 | 7/2004 | Arimilli et al. | |
| 2004/0215371 A1* | 10/2004 | Samson et al. | 700/299 |
| 2005/0128846 A1* | 6/2005 | Momtaz et al. | 365/221 |
| 2005/0149768 A1 | 7/2005 | Kwa et al. | |
| 2005/0283561 A1* | 12/2005 | Lee et al. | 710/307 |
| 2006/0174142 A1 | 8/2006 | Lin et al. | |
| 2006/0224806 A1 | 10/2006 | Suzuki | |
| 2007/0005995 A1 | 1/2007 | Kardach et al. | |
| 2007/0094436 A1* | 4/2007 | Keown et al. | 710/307 |
| 2007/0180281 A1* | 8/2007 | Partovi et al. | 713/320 |
| 2007/0300088 A1 | 12/2007 | Lippojoki | |
| 2008/0062927 A1 | 3/2008 | Zhu et al. | |
| 2008/0074992 A1 | 3/2008 | Sams et al. | |
| 2008/0162748 A1 | 7/2008 | Fanning | |
| 2008/0162855 A1* | 7/2008 | Thomas | 711/167 |
| 2008/0307244 A1 | 12/2008 | Bertelsen et al. | |
| 2009/0164684 A1* | 6/2009 | Atherton et al. | 710/300 |
| 2009/0210595 A1 | 8/2009 | Chaussade | |
| 2009/0259713 A1 | 10/2009 | Blumrich et al. | |
| 2010/0083026 A1 | 4/2010 | Millet et al. | |
| 2010/0153759 A1 | 6/2010 | Singhal | |
| 2010/0162019 A1 | 6/2010 | Kumar et al. | |
| 2010/0257393 A1 | 10/2010 | Zhuang et al. | |
| 2010/0281195 A1* | 11/2010 | Daniel et al. | 710/105 |
| 2011/0293035 A1 | 12/2011 | Kobayashi | |
| 2011/0296216 A1 | 12/2011 | Looi et al. | |
| 2011/0296222 A1 | 12/2011 | Tan et al. | |

FOREIGN PATENT DOCUMENTS

| | | | |
|---|---|---|---|
| JP | 20060285872 A | 10/2006 | |
| JP | 2007517332 A | 6/2007 | |
| JP | 2007249808 A | 9/2007 | |
| JP | 2008194563 A | 8/2008 | |
| JP | 2009217813 A | 9/2009 | |
| JP | 2010500807 A | 1/2010 | |
| JP | 2010515164 A | 5/2010 | |
| TW | 546560 B | 8/2003 | |
| WO | 89/04516 A1 | 5/1989 | |
| WO | 2008018017 A2 | 2/2008 | |
| WO | 2011/153042 A2 | 12/2011 | |
| WO | 2011/153042 A3 | 4/2012 | |
| WO | 2012/047600 A2 | 4/2012 | |
| WO | 2012/088530 A2 | 6/2012 | |
| WO | 2012/047600 A3 | 8/2012 | |
| WO | 2012/088530 A3 | 12/2012 | |

OTHER PUBLICATIONS

'Data link layer'. "The Free Online Dictionary of Computing". Online Feb. 14, 1995. Retrieved from Internet Apr. 4, 2014. <http://foldoc.org/data+link+layer>.*

Lieberherr, Jorg. "Data Link Layer". CS 457—Computer Networks. University of Virginia. 1998.*

Cox, G.W. "L2: Data Link Layer". CS 570. The University of Alabama in Huntsville. 2007.*

International Search Report and Written Opinion Received for PCT Application No. PCT/US2011/037990, mailed on Feb. 9, 2012, 10 pages.

International Search Report and Written Opinion Received for the PCT Application No. PCT/US2011/067260, mailed on Aug. 14, 2012, 9 pages.

Berktold et al., CPU Monitoring With DTS/PECI, Intel Corporation, White Paper, Sep. 2009, pp. 1-23.

International Search Report and Written Opinion Received for the PCT Application No. PCT/US2011/053335, mailed on Jun. 22, 2012, 9 pages.

Office Action received for Chinese Patent Application No. 201110158611.5, mailed on Jun. 7, 2013, 5 pages of English Translation and 6 pages of Office Action.

Office Action received for U.S. Appl. No. 12/791,836, mailed on Sep. 17, 2012, 6 pages.

Office Action received for U.S. Appl. No. 12/791,836, mailed on Apr. 2, 2013, 7 pages.

International Preliminary Report on Patentability and Written Opinion received for the PCT Application No. PCT/US2011/053335, mailed on Apr. 4, 2013, 6 pages.

International Preliminary Report on Patentability and Written Opinion received for PCT Application No. PCT/US2011/037990, mailed on Dec. 13, 2012, 5 pages.

International Preliminary Report on Patentability and Written Opinion received for PCT Application No. PCT/US2011/067260, mailed on Jul. 4, 2013, 6 pages.

Final Office Action received for U.S. Appl. No. 12/791,836, mailed on Dec. 16, 2013, 5 pages.

Office Action received for U.S. Appl. No. 12/978,452, mailed on Sep. 20, 2013, 9 pages.

Office Action received for Taiwan Patent Application No. 100134377, mailed on Nov. 13, 2013, 9 pages of English Translation and 9 pages of Taiwan Office Action including Search Report.

European Search Report received for EP Patent Application No. 11790212.2, mailed on Jan. 8, 2014, 6 pages.

Office Action received for Japanese Patent Application No. 2013-513224, mailed on Dec. 10, 2013, 6 pages of office action including 3 pages of English Translation.

Office Action received for Taiwan Patent Application No. 100134377, mailed on May 20, 2014, 11 pages of Office Action including 6 pages of English Translation.

Supplementary Search Report received for European Patent Application No. 11790212.2, mailed on Jan. 24, 2014, 1 page.

Notice of Allowance received for U.S. Appl. No. 12/791,836, mailed on Mar. 26, 2014, 5 pages.

Notice of Allowance received for U.S. Appl. No. 12/791,836, mailed on May 28, 2014, 5 pages.

Notice of Allowance received for U.S. Appl. No. 12/978,452, mailed on Mar. 18, 2014, 5 pages.

Office Action received for Chinese Patent Application No. 201110158611.5, mailed on Feb. 8, 2014, 8 pages of English Translation only.

Office Action received for Chinese Patent application No. 201180046078.1 mailed on Dec. 2, 2014, 22 pages including 12 pages of English Translation.

Office Action received for Chinese Patent Application No. 201180046078.1 mailed on Jul. 28, 2015, 28 pages including 16 pages of English translation.

* cited by examiner

THROTTLING INTEGRATED LINK

RELATED APPLICATION

The present application relates to and claims priority from U.S. Provisional Patent Application No. 61/386,505, filed on Sep. 25, 2010, entitled "THROTTLING INTEGRATED LINK" which is hereby incorporated herein by reference in its entirety and for all purposes.

FIELD

The present disclosure generally relates to the field of electronics. More particularly, an embodiment of the invention relates to techniques for throttling an interface that is integrated on the same die as a processor.

BACKGROUND

In some current implementations, a processor may communicate with input/output (I/O) devices via an I/O Hub (IOH). Furthermore, the processor may be provided on a different integrated circuit (IC) device than the IOH. A bus may be used to communicate between these IC devices.

Such implementations may, however, reduce speed, e.g., due to delay associated with communicating signals between the IC devices, and/or increase power consumption, e.g., due to presence of additional circuitry required to allow for communication between the IC devices. Also, additional (board) space may be required for the discrete IOH component(s).

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
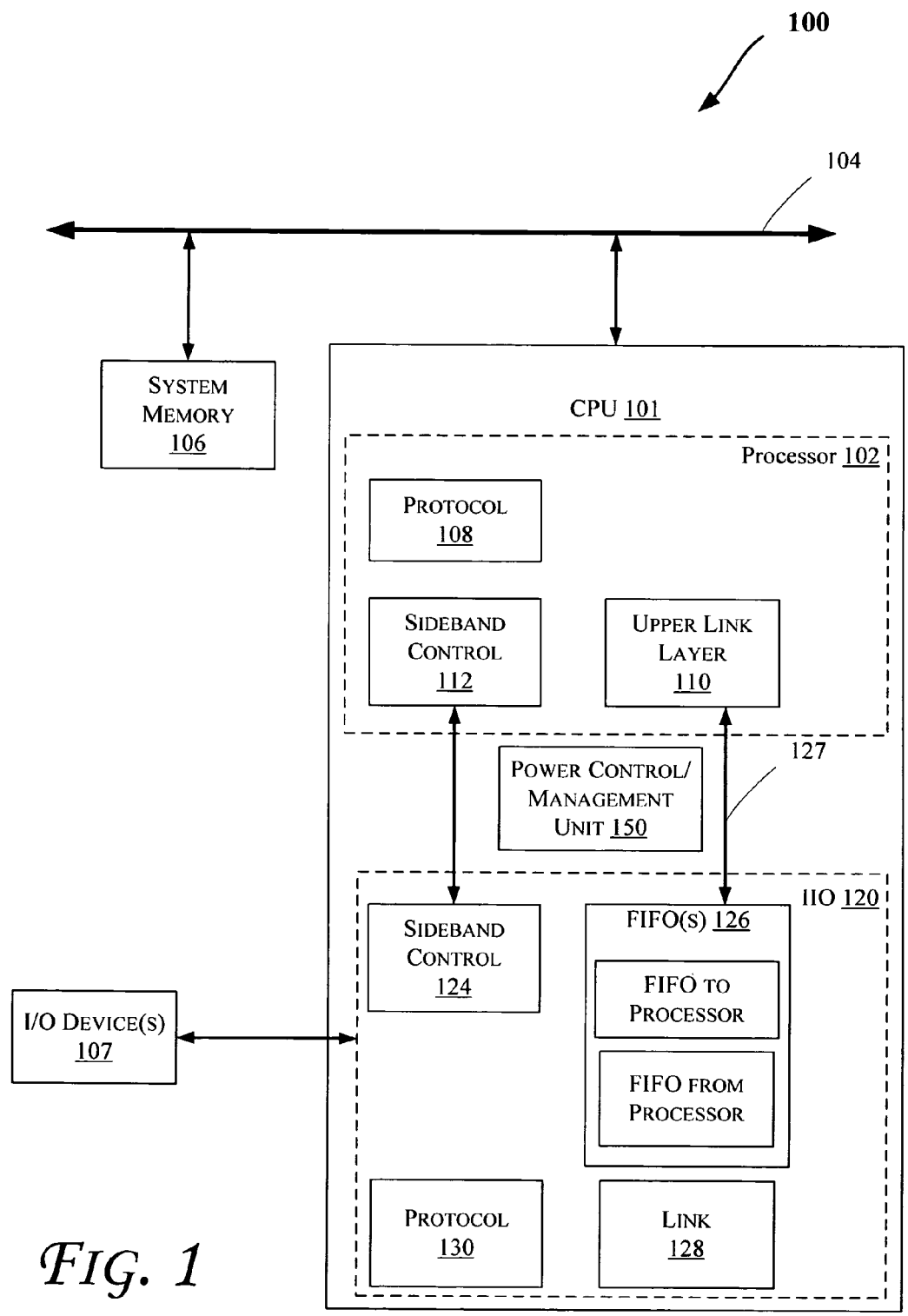
FIGS. 1 and 5-6 illustrate block diagrams of embodiments of computing systems, which may be utilized to implement various embodiments discussed herein.

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments relate to techniques to throttle a link (such as a Peripheral Component Interconnect Express™ (PCIe) interconnect (in accordance with the PCI Express™ Specification Base Specification version 2.0 (published Jan. 17, 2007)) that is integrated on the same Integrated Circuit (IC) die as other components (e.g., one or more processor cores). Such embodiments may reduce delay, reduce power consumption, reduce die size, and/or reduce complexity associated with power management in a computing device. In addition, some embodiments allow for more control and/or communication bandwidth between two integrated components (such as PCIe component(s) and/or processor core(s)), e.g., to further refine power state manipulation/control.

One embodiment allows integration of a PCIe Gen 2.0 interconnect into the CPU (Central Processing Unit) die and making it work safely at low power envelope parts where the PCIe temperature may become as high as core temperature. It allows to do so while meeting PCIe specification requirements. This is done by utilizing "Force Toggle Tx L0s" to perform thermal throttling of the Tx (transmit) link of PCIe using an on/off modulation, in an embodiment. For Rx (receive) link of PCIe, not sending credits may be used to force throttling in one embodiment.

In one embodiment, an IOH may be integrated on the same IC device as a processor (which may include one or more processor cores as discussed herein in more detail below). This allows for removal of logic that is only needed for off-chip communication. For example, logic associated with transmission of signals off chip across an interconnect (e.g., physical link) may be removed. Also, logic that would normally control transmitting, training, testing, power state management, etc. of the physical link may be removed. Even though the physical link and additional logic is removed, the same communication mechanisms may still be maintained in some embodiments, e.g., to allow for compatibility with other existing logic, communication protocols, design requirements, etc. For instance, in a QPI (Quick Path Interconnect) based processor, the QPI physical layer and lower link layer may be removed. For the accompanying IOH, the physical layer may be.

One or more of the above-mentioned elements may be provided in various computing environments. More particularly, FIG. 1 illustrates a block diagram of portions of a computing system 100, according to an embodiment.

The system 100 may include a Central Processing Unit (CPU) 101 (or more generally a processor) which includes a processor portion 102. CPU 101 components may be on a single IC die. The CPU 101 may include one or more processors (or processor cores) as discussed herein, e.g., with reference to FIG. 5. The processor 102 may include various components, such as one or more processor cores, private or shared cache(s), one or more memory/graphics control modules, etc. (not shown). Moreover, the CPU 101 may communicate through a bus 104 with other components such as a system memory 106. The memory 106 may store data at the direction of the CPU 101, e.g., communicated with one or more I/O devices 107. The device(s) 107 may be a peripheral device that communicates in accordance with the PCIe (including PCIe Generation 2.0 and/or other proprietary or non-proprietary I/O interconnect(s) such as Direct Memory Interface (DMI)) in some embodiments. As will be further discussed below, the CPU 101 may include an IIO 120 that provides support for communicating with the device(s) 107 in accordance with the aforementioned PCIe specifications and/or DMI.

As illustrated in FIG. 1, the processor 102 may include a protocol logic 108 (e.g., to provide the support for shutting down or waking system 100), an upper link layer logic 110 (e.g., to provide link support for upper link layer communication with the IIO 120), and a sideband control logic 112 (e.g., to provide sideband communication support in lieu of removal of the QPI physical layer and lower link layer, as discussed above). In an embodiment, the upper link layer logic may include one or more of: virtual channel queue(s), flow control and/or credits logic, CRC (Cyclical Redundancy Check) check and/or generation logic, parameter exchange logic, etc. Furthermore, the removed lower link layers, in accordance with some embodiments, may include Phit/Flit assembly/deassembly/swizzling, physical layer control registers, link power (e.g., L0s) and width modes, link initialization/training, etc.

The IIO 120 may include a sideband control logic 124 (e.g., to communicate sideband signals with the logic 112), one or more FIFOs 126 (e.g., to enable deterministic data transfer between the upper link layer 110 and IIO 120 via an interconnect/bus 127), a link logic 128 (e.g., to provide link support for communication between the processor 102 and the IIO 120), and a protocol logic 130 (e.g., to provide the support for shutting down or waking system 100).

In an embodiment, a relatively wider and/or slower bus/interconnect 127 may eliminate high speed circuit and power challenges (when compared with the bus/interconnect that couples the non-integrated processor and IOH, for example). In one embodiment, the bus 127 is widened four times, allowing the frequency to be reduced by four times. A valid bit may be added to allow for more flexibility (null flits are now optional, etc.) and/or to support tester modes.

In some embodiments, FIFOs 126 going in both directions (to and from IIO 120) are added. When transferring data between the processor 102 components (e.g., logic 110) and IIO 120, the data is written into a FIFO based on a write pointer and is read by the receiver based on a read pointer. The separation of the write and read pointers may be programmable, for example, to account for clock skew differences between the processor 102 components (e.g., logic 110) and IIO 120. This allows the processor 102 and IIO 120 to run off of different Phase-Locked Loops (PLLs) for flexibility, finer granularity of power states, etc.

In an embodiment, the following sideband signals may be used (e.g., via logics 112 and/or 124):
1. From the IIO 120:
   A. IIO_wake—IIO 120 requests to wake system 100 that is in low power mode; and
   B. IIO_is_awake—IIO 120 is awake and may function (for instance, power is ramped, PLL's locked, etc.); and
2. From the processor 102:
   A. processor_wake (e.g., WAKEUP_IIO_PLL)—processor 102 request to wake system 100 that is in low power mode; and
   B. processor_is_awake (e.g., BGFRun)—processor 102 is awake. In some embodiments, this signal may also indicate both the processor 102 and IIO 120 are awake. In turn, the processor 102 may determine when the whole CPU 101 chip is up and ready to run based on the IIO_is_awake signal. This signal may reset the FIFO pointers and allows the FIFO(s) 126 it to transfer data.
   C. processor_temp_high (e.g., PCUtoIIOTempHigh)—processor 102 generates or causes a signal to be generated in response to a detected temperature (e.g., detected by one or more sensors on the die) that a threshold temperature (e.g., which may be programmable) has been reached.

As shown in FIG. 1, the CPU 101 may also include a power control/management unit 150 which may receive signals from one or more sensors (not shown) that detect temperature values (e.g., in various portions of the die that includes the CPU 102). In turn, the power control/management unit 150 may determine whether a threshold temperature (e.g., which may be programmable) has been reached and cause generation of a signal to indicate this condition (such as PCUtoIIOTempHigh signal discussed below). The signal may in turn cause throttling of one or more transmit/receive links, as will be further discussed below.

Moreover, in an embodiment, force L0s Tx (Transmit) may be implemented as follows: (1) the Power Control/Management Unit 150 asserts PCUtoIIOTempHigh signal; (2) the assertion of PCUtoIIOTempHigh signal initiates the ForceTxL0s state machine (see, e.g., FIGS. 2-3); (3) The ForceTxL0s state machine "toggles" the Tx link between L0 and L0s (providing on/off modulation of the Tx link, respectively); (4) The Tx link remains in ForceTxL0s for a programmable duration. During this duration, the IIO does not ACK (acknowledgement) signals for any packets received on Rx link. One design simplification is that at least some of this may follow what is already in the RTL (Resistor Transistor Logic) in some embodiments (for example, a smart heuristic may already be implemented and hence the Force L0s TX state machine will reuse at least portions of that state machine); (5) Tx unit sends ACKS (acknowledgements) so as not to trigger an error recovery at the end-point of the link. Also, the ForceTxL0s state machine, periodically or at a programmable interval (e.g., on a current direction: whenever the existing L0s state machines does so), goes to L0, sends ACKs (for example, to avoid triggering of error recovery), and goes back to L0s. No credits are released, thus performing flow control on Rx link.

In some embodiments, the policy for sending ACKs under Force L0s on Tx depends on the implementation of the existing L0s state machine and the policy it follows for sending ACKs. For example, if the existing implementation is smart, then the Force L0s Tx will not implement a timer for the ACK and rely on the existing ACK implementation.

In an embodiment, eventually, the Rx link (the end-point Tx) will run out of credits, may detect an idle and automatically go to L0s. One goal of some embodiments is that at the end a seamless integration into the existing state machine with minimal changes is provided. Some key timer values are as follows: for example, if link in L0 or L0s, an Update FCPs is scheduled for transmission at least once every 30 us (or micro seconds). Also, a timeout may be optional, e.g., with a timer of 200 us and link re-training may occur. Further, a Completion timeout may be configured for 50 us at least, 50 ms at most. Three issues to keep track of include: (1) cannot put into L0s so long that end point thinks there is an error (and link starts re-training); (2) send ACK to end-point on Rx packets within a certain time period of receiving the packets; (3) UpdateFCP is be returned such that the time to send/receive/process the UpdateFCPs is sufficient.

Figure 2:
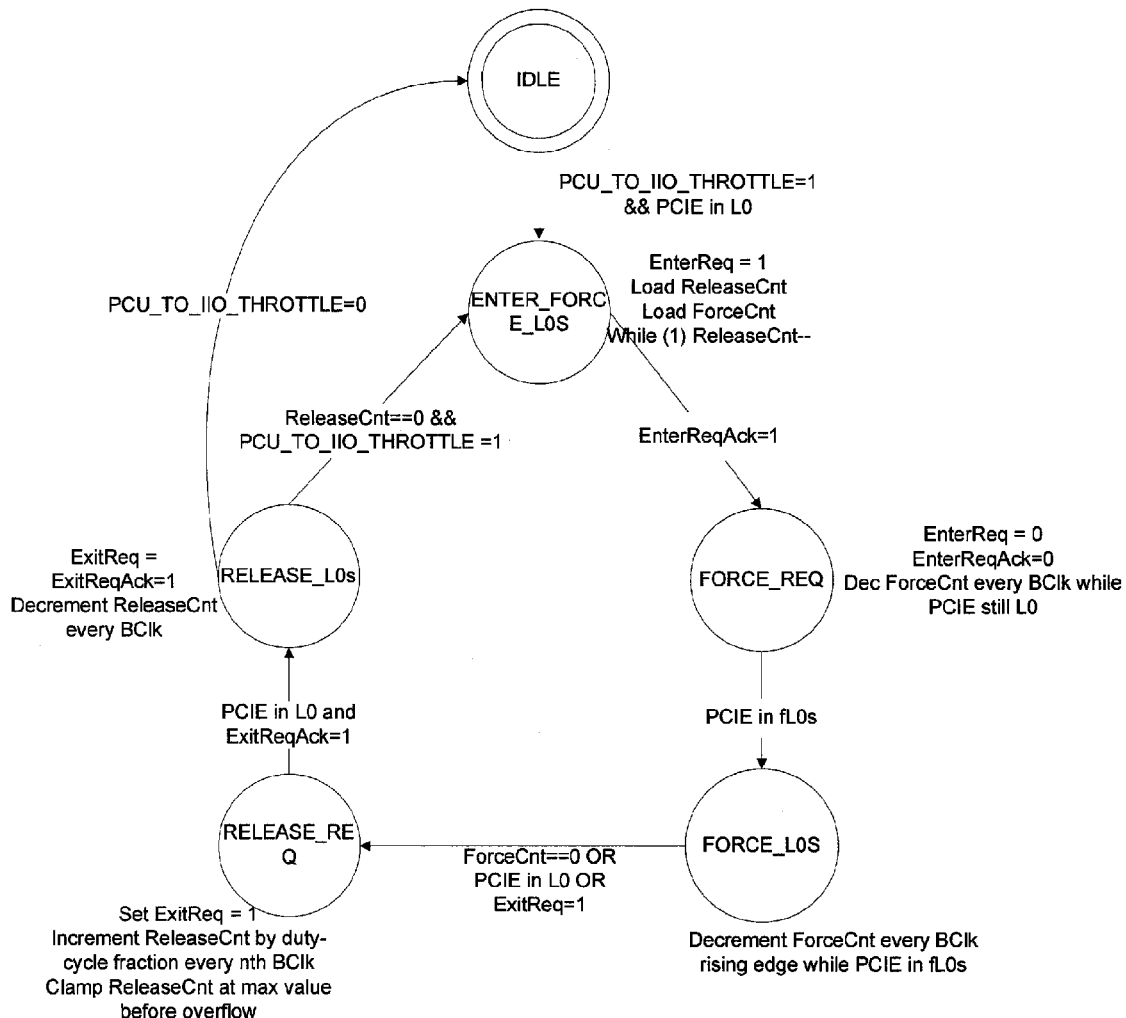
FIGS. 2-3 illustrate state diagrams according to some embodiments.
Figure 3:
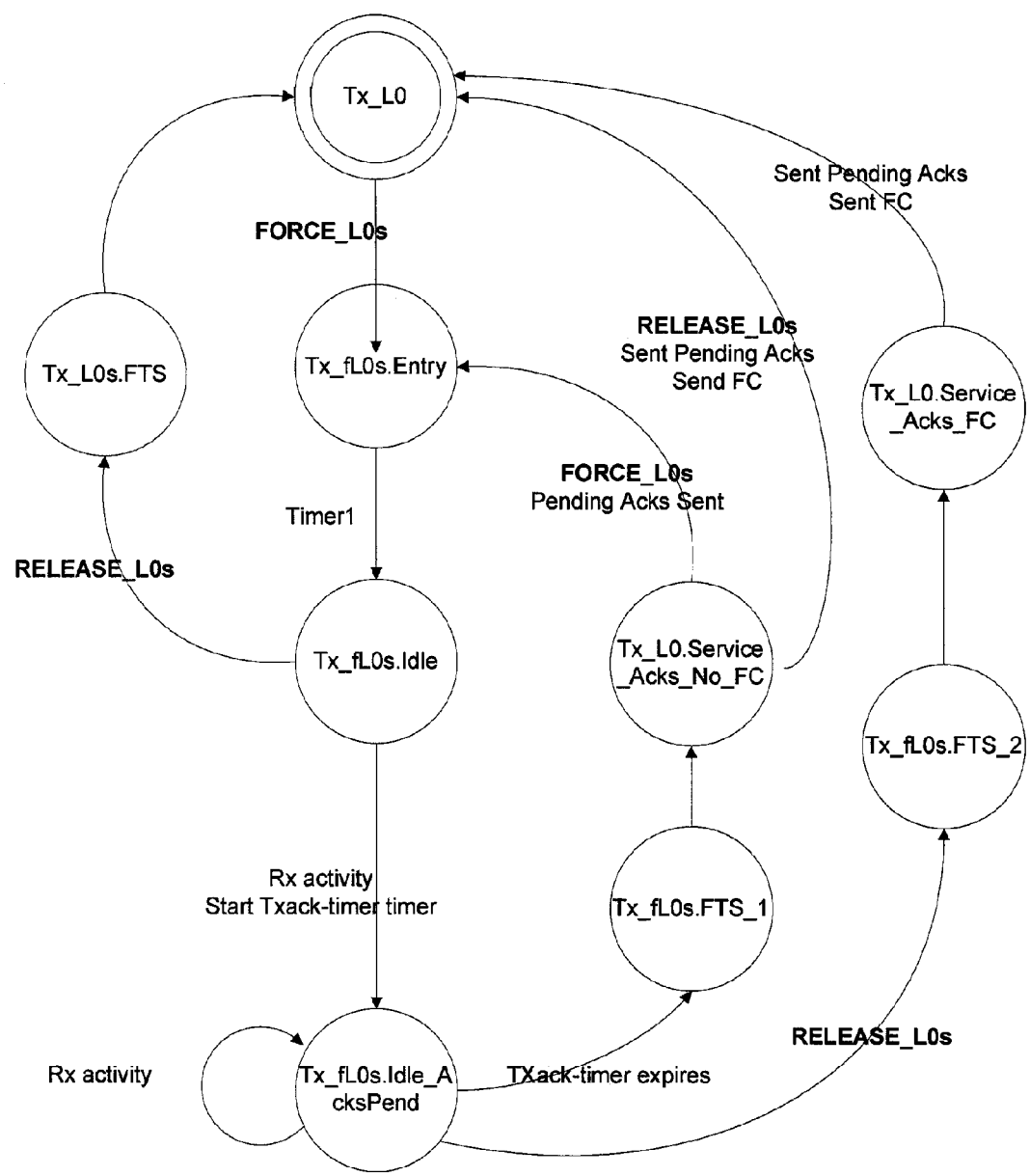

FIGS. 2-3 illustrate high-level state transition diagrams for Tx Force L0s, according to some embodiments. These state machines may be distinct entities and separate from any pre-existing idle-based L0s state machines. In an embodiment, these state machines may co-exist safely and inter-operate correctly. As shown, two state machines exist in some embodiments: the state machine of FIG. 2 which controls the duty cycle to Force and Release Tx L0s and FIG. 3 which cycles through the Force L0s machines.

Also, three programmable registers may be provided:
   THFL0SPERIOD: Controls the duration of one Force/Release period. Specified in u-secs (short for micro seconds).
   THFL0SDUTY: Controls the duration the L0s is released.
   THFL0SACKTIMER: Controls how long to buffer Acks prior to pulling the link out of L0s to service Acks. Specified in u-secs. (de-feature present)

The first state machine of FIG. 2 asserts the Force L0s and Release L0s signals that control the second state machine of FIG. 3. Defeature bit: CTCTRL[3] defeatures Force Tx L0s. Depending on the implementation, one or more states of these machines may be combined. Also, the state machines are only meant to demonstrate a conceptual view, and the actual implementation and final state machine will depend on the existing RTL, for example.

Figure 4:
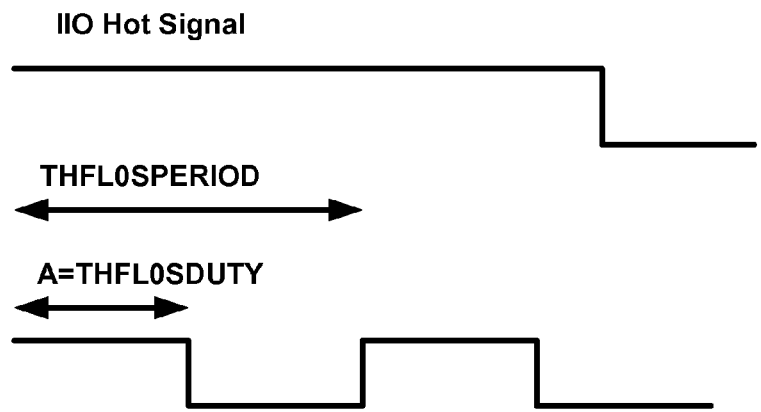
FIG. 4 illustrates a timing diagram according to an embodiment.

In some embodiments, two registers are provided for specifying the THFL0SPERIOD and THFL0SDUTY. Their timing relationship is shown in FIG. 4. For example, during the period "A", no Transaction Layer Packets or TLPs (including completions) will be sent and no flow control credits will be returned.

Moreover, the Update Flow Control (UFC) message (but returning zero credits) is sent as would be done by the existing RTL implementation and there will be no special attempt to control when to send this update in an embodiment. When the UFC message needs to be sent, the link will be brought out of L0s, the UFC message sent, and the link will go back to L0s. The number of credits returned will be 0 in the time period A.

Some embodiments may use a heuristic to decide when to send ACKs. The Force Tx L0s may not try to explicitly control this and whenever the existing state machine requires sending an ACK, the link will be brought out of L0s, the ACKs sent, and then the link will go back to L0s. The UFC message and the Ack timers may already exist in the existing state machine. At the end of time period A, the flow control credits will be returns, and all TLPs sent. PM messages and a few other conditions (depending on RTL analysis) will also result in the link coming out of L0s.

Some optional exceptions include:

If L0s is disabled by the BIOS (Basic Input/Output System), then Force L0s will not be enabled. This may be the case even if the sensor indicates the IIO PCIE link should do Force L0s.

When the PCIE link is starting, while the chip is already hot, it does so under full power and is not throttled. In other words, Force L0s may not be effective while the link is initializing (in RTL, the force L0s is qualified with a "dl_active". dl_active comes true when the link has finished initializing FC and goes false when the link is down).

DMI ports may chose not to engage in Force L0s.

Figure 5:
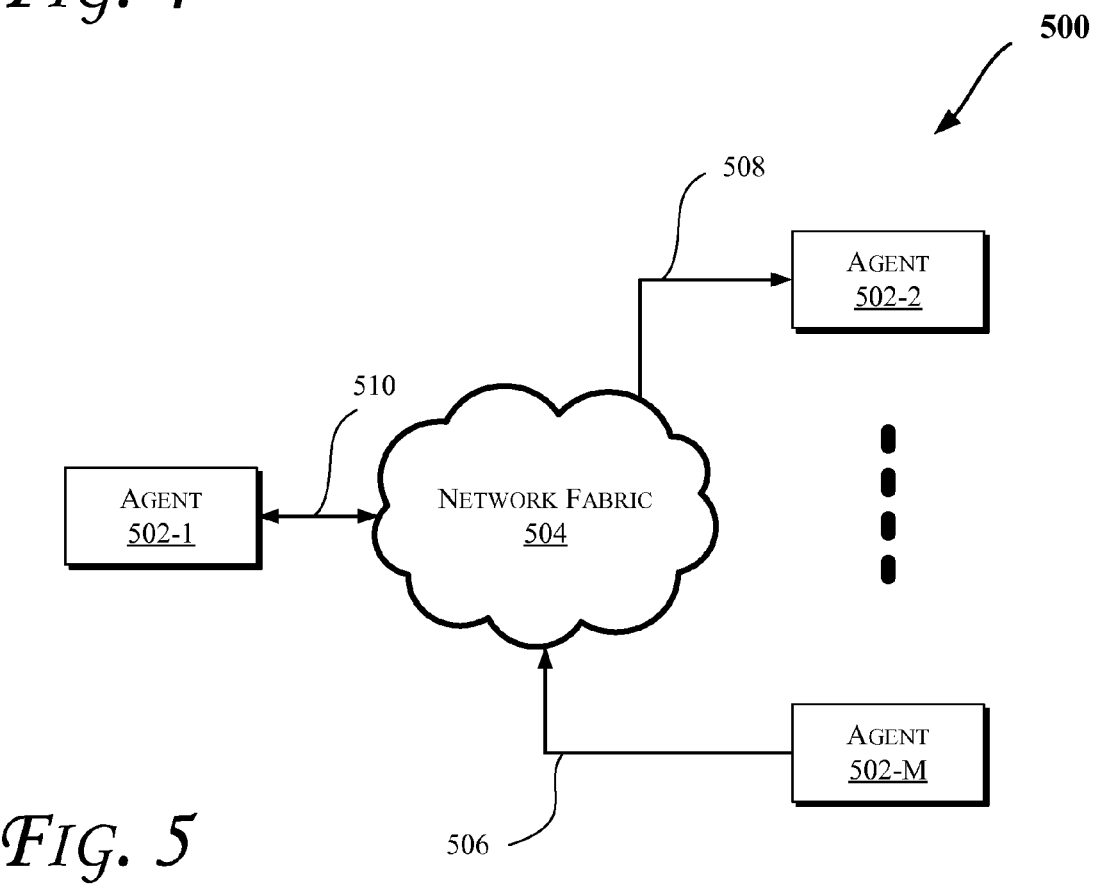

FIG. 5 illustrates a block diagram of a computing system 500, according to an embodiment of the invention. The system 500 may include one or more agents 502-1 through 502-M (collectively referred to herein as "agents 502" or more generally "agent 502"). In an embodiment, one or more of the agents 502 may be any of components of a computing system, such as the computing systems discussed with reference to FIG. 1 or 6.

As illustrated in FIG. 5, the agents 502 may communicate via a network fabric 504. In one embodiment, the network fabric 504 may include a computer network that allows various agents (such as computing devices) to communicate data. In an embodiment, the network fabric 504 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 500 may support a layered protocol scheme, which may include a physical layer, a link layer, a routing layer, a transport layer, and/or a protocol layer. The fabric 504 may further facilitate transmission of data (e.g., in form of packets) from one protocol (e.g., caching processor or caching aware memory controller) to another protocol for a point-to-point or shared network. Also, in some embodiments, the network fabric 504 may provide communication that adheres to one or more cache coherent protocols.

Furthermore, as shown by the direction of arrows in FIG. 5, the agents 502 may transmit and/or receive data via the network fabric 504. Hence, some agents may utilize a unidirectional link while others may utilize a bidirectional link for communication. For instance, one or more agents (such as agent 502-M) may transmit data (e.g., via a unidirectional link 506), other agent(s) (such as agent 502-2) may receive data (e.g., via a unidirectional link 508), while some agent(s) (such as agent 502-1) may both transmit and receive data (e.g., via a bidirectional link 510).

Figure 6:
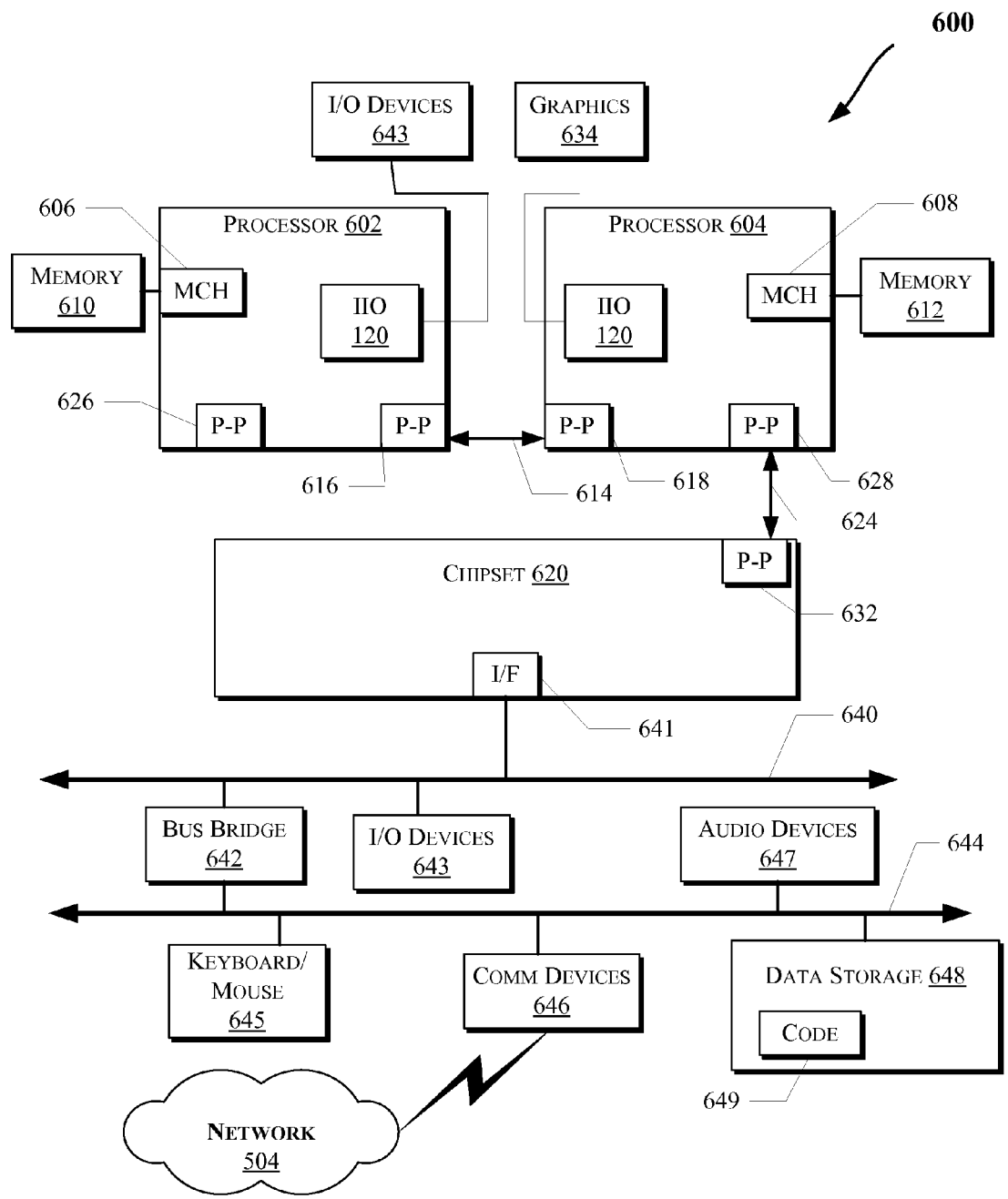

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 106 of FIG. 1. As shown in FIG. 6, the processors 602 and 604 may also include IIO logic 120 such as those discussed with reference to FIGS. 1-5. Moreover, even though an IIO logic 120 is illustrated for each processor in FIG. 6, some embodiments may utilize a single IIO logic 120. Also, even though FIG. 6 illustrates each IIO logic 120 coupled to one I/O device or I/O device type, each IIO logic 120 may be coupled to more than one or more than one type of I/O devices.

In an embodiment, the processors 602 and 604 may be one of the processors 602 discussed with reference to FIG. 6. The processors 602 and 604 may exchange data via a point-to-point (PtP) interface 614 using PtP interface circuits 616 and 618, respectively. Also, one or more of the processors 602 and 604 may exchange data with a chipset 620 via individual PtP interfaces (e.g., interface 624) using point-to-point interface circuits 626, 628, and 632. In the embodiment shown in FIG. 6, only one processor (processor 604) may communicate with the chipset 620. Through the IIO logic 120, a processor (e.g., processor 604) may exchange data with a high-performance graphics circuit 634.

In at least one embodiment, the I/O functionality may be integrated into the processors 602/504. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 (e.g., using an interface circuit 641). The bus 640 may have one or more devices that communicate with it, such as a bus bridge 642 and I/O devices 643 (which may communicate with the IIO via other components such as shown in FIG. 6 or directly as shown in FIG. 1, for example). Via a bus 644, the bus bridge 642 may communicate with other devices such as a keyboard/mouse 645, communication devices 646 (such as modems, network interface devices, or other communication devices that may communicate with the computer network 505), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a (for example, non-transitory) machine-readable or computer-readable storage medium having stored thereon instructions (or software procedures) used to program a computer to perform a process discussed herein.

The storage medium may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions). Volatile memory may include devices such as random access memory (RAM), dynamic RAM (DRAM), synchronous DRAM (SDRAM), static RAM (SRAM), etc.

Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided in a propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An integrated circuit device comprising:
    a processor; and
    an Integrated Input/Output (IIO) logic coupled to the processor,
    wherein a signal causes throttling of a point-to-point link coupled between the IIO logic and an Input/Output (IO) device, wherein a first First-In, First-Out (FIFO) device stores data transmitted from the processor to the IIO logic and a second FIFO stores data transmitted to the processor from the IIO logic, wherein read and write pointers of the first and second FIFOs are reset to transfer data between the processor and the IIO logic in response to an indication that the processor and the IIO logic are awake, wherein separation of the read and write pointers is configurable to account for clock skew differences between an upper link layer logic of the processor and the IIO logic, wherein the link is one of a transmit link or a receive link, wherein throttling of the transmit link is performed by an on or off modulation, wherein the transmit link remains in an off state for a first duration, wherein the transmit link transmits an acknowledgement signal during an on state in response to receiving a packet on the receive link and within a second duration from receiving the packet.

2. The device of claim 1, wherein the first duration or the second duration is a programmable duration.

3. The device of claim 1, wherein during the first duration, the transmit link refrains from sending one or more acknowledgement signals for any packets received on the receive link.

4. The device of claim 1, wherein during the first duration, the transmit link sends acknowledgement signals to avoid triggering of an error recovery at an endpoint of the link.

5. The device of claim 1, wherein during the first duration, the transmit link exits the off state at a programmable interval, sends acknowledgement signals, and returns to the off state.

6. The device of claim 1, wherein throttling of the receive link is performed by refraining from sending credits to the transmit link.

7. The device of claim 1, wherein the transmit link enters an off state in response to lack of existing credits and detection of an idle state.

8. The device of claim 1, wherein the processor comprises a plurality of processor cores.

9. The integrated circuit device of claim 1, wherein the upper link layer logic provides link support for upper link layer communication with the IIO logic.

10. The integrated circuit device of claim 1, wherein the upper link layer logic includes one or more of: a virtual channel queue, flow control or credits logic, CRC (Cyclical Redundancy Check) check or generation logic, and parameter exchange logic.

11. A method comprising:
    generating a signal to cause throttling of a link coupled between an IIO logic and an Input/Output (IO) device in response to detection of a temperature value at the link, wherein the link is a point-to-point link, wherein the link is to comprise a transmit link or a receive link, wherein a first First-In, First-Out (FIFO) device stores data transmitted from a processor to the IIO logic and a second FIFO stores data transmitted to the processor from the IIO logic, wherein read and write pointers of the first and second FIFOs are reset to transfer data between the processor and the IIO logic in response to an indication that the processor and the IIO logic are awake, wherein separation of the read and write pointers is configurable to account for clock skew differences between an upper link layer logic of the processor and the IIO logic, wherein throttling of the transmit link is performed by an on or off modulation, wherein the transmit link remains in an off state for a first duration, wherein the transmit link transmits an acknowledgement signal during an on state in response to receiving a packet on the receive link and within a second duration from receiving the packet.

12. The method of claim 11, wherein the first duration or the second duration is a programmable duration.

13. The method of claim 11, further comprising, during the first duration, the transmit link exiting the off state at a programmable interval, sending one or more acknowledgement signals, and returning to the off state.

14. The method of claim 11, wherein throttling of the receive link is performed by refraining from sending credits to the transmit link and wherein the transmit link enters an off state in response to lack of existing credits and detection of an idle state.

15. The method of claim 11, further comprising communicating data between a system memory and the I/O device via the IIO logic.

16. The method of claim 11, wherein the upper link layer logic includes one or more of: a virtual channel queue, flow control or credits logic, CRC (Cyclical Redundancy Check) check or generation logic, and parameter exchange logic.

17. A system comprising:
a system memory to store data;
a processor to access the stored data; and
an Integrated Input/Output (ITO) logic coupled to the processor,
wherein a signal causes throttling of a point-to-point a link coupled between the IIO and an Input/Output (JO) device,
wherein data is communicated between the system memory and one or more I/O devices via the IIO logic,
wherein the link is a transmit link or a receive link, wherein a first First-In, First-Out (FIFO) device stores data transmitted from the processor to the IIO logic and a second FIFO stores data transmitted to the processor from the IIO logic, wherein read and write pointers of the first and second FIFOs are reset to transfer data between the processor and the IIO logic in response to an indication that the processor and the IIO logic are awake, wherein separation of the read and write pointers is configurable to account for clock skew differences between an upper link layer logic of the processor and the IIO logic, wherein throttling of the transmit link is performed by an on or off modulation, wherein the transmit link remains in an off state for a first duration, wherein the transmit link transmits an acknowledgement signal during an on state in response to receiving a packet on the receive link and within a second duration from receiving the packet.

18. The system of claim 17, wherein the first duration or the second duration is a programmable duration.

19. The system of claim 17, wherein throttling of the receive link is performed by refraining from sending credits to the transmit link.

* * * * *